US010230664B1

(12) United States Patent
Pushkarev et al.

(10) Patent No.: US 10,230,664 B1
(45) Date of Patent: Mar. 12, 2019

(54) STRATEGIC RESOURCE ALLOCATION IN A WEB-BASED COMPUTING SYSTEM

(71) Applicant: AMAZON TECHNOLOGIES, INC., Reno, NV (US)

(72) Inventors: Dmitry Pushkarev, Palo Alto, CA (US); Joshua Marc Burgin, Seattle, WA (US); Aniruddha Shrlram Daptardar, Redmond, WA (US); Derek Solomon Pai, Seattle, WA (US); Joby Sky Lafky, Seattle, WA (US); Anupama Sharma, Seattle, WA (US); Christoph Saalfeld, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 588 days.

(21) Appl. No.: 14/860,615

(22) Filed: Sep. 21, 2015

(51) Int. Cl.
 *G06F 15/173* (2006.01)
 *H04L 12/911* (2013.01)
(52) U.S. Cl.
 CPC .................... *H04L 47/82* (2013.01)
(58) Field of Classification Search
 CPC ...................................................... H04L 47/82
 USPC ....................................................... 709/226
 See application file for complete search history.

(56) References Cited

U.S. PATENT DOCUMENTS

| | | | | |
|---|---|---|---|---|
| 9,495,211 | B1* | 11/2016 | Helstroom | G06F 9/50 |
| 2007/0288526 | A1* | 12/2007 | Mankad | G06F 11/1662 |
| 2010/0121975 | A1* | 5/2010 | Sinha | H04L 65/103 |
| | | | | 709/231 |
| 2013/0204917 | A1* | 8/2013 | Wang | G06F 9/5066 |
| | | | | 709/201 |
| 2016/0162338 | A1* | 6/2016 | Sathyamurthy | G06F 9/5077 |
| | | | | 718/1 |

* cited by examiner

*Primary Examiner* — SM A Rahman
(74) *Attorney, Agent, or Firm* — Blank Rome LLP

(57) ABSTRACT

This document describes techniques for allocating instances in a service provider network. In an example embodiment, a resource manager provides a number of allocation strategies for determining which instances to assign to a client. The resource manager applies a client selected one of the allocation strategies to assign instances to the client. One of the allocation strategies includes determining for each of a plurality of pools of resource instances, an estimate of time that a unit cost of each of the number of resource instances in the pool will be no more than a maximum unit cost specified by the client. The instances are assigned to the client while the unit cost of the instances is less than a client specified amount.

20 Claims, 13 Drawing Sheets

300A

| REQUEST SPOT INSTANCES | ☒ |

NUMBER OF INSTANCES: [10] ← 302

INSTANCE TYPE:
    SMALL ☐
    MEDIUM ☐ ← 304
    LARGE ☐

AVAILABILITY ZONE: [▼] ← 322

MACHINE IMAGE: [▼] ← 324

MAX PRICE: [$0.05] ← 306

ALLOCATION STRATEGY: [LOWEST COST ▼] ← 308
                     DIVERSITY
                     AVAILABILITY

AUTOMATIC REOPTIMIZATION: ☐ ← 312

REOPTIMIZATION COST DIFFERENTIAL: [$5.00] ← 314

REOPTIMIZATION INTERVAL: [60 MINUTES] ← 320

REQUEST SPOT INSTANCES

NUMBER OF INSTANCES: [10] ← 302

INSTANCE TYPE:
- SMALL ■
- MEDIUM ■ ← 304
- LARGE ■

AVAILABILITY ZONE: [▼] ← 322
MACHINE IMAGE: [▼] ← 324

MAX PRICE: [$0.05] ← 306

308

ALLOCATION STRATEGY: [DIVERSITY ▼]
AVAILABILITY
LOWEST COST

AUTOMATIC REOPTIMIZATION: ■ ← 312

REOPTIMIZATION COST DIFFERENTIAL: [$5.00] ← 314

REOPTIMIZATION INTERVAL: [60 MINUTES] ← 320

```
REQUEST SPOT INSTANCES                              ☒

302
NUMBER OF INSTANCES: [10] ↙

INSTANCE TYPE:
    SMALL    ■
    MEDIUM   ■  ↙ 304
    LARGE    ■

AVAILABILITY ZONE:  [ ▼ ]  ← 322
MACHINE IMAGE:      [ ▼ ]  ← 324

MAX PRICE: [$0.05] ← 306           308
                                    ↙
ALLOCATION STRATEGY: [AVAILABILITY ▼]
                      DIVERSITY
                      LOWEST COST

318
DURATION: [16 HOURS] ←

LOW                    HIGH
  ├────────□───────────┤
                        ↖ 310
TOLERANCE TO INSTANCE LOSS

AUTOMATIC REOPTIMIZATION:  [■] ← 312

REOPTIMIZATION COST DIFFERENTIAL: [$5.00]
                                            ↘ 314
REOPTIMIZATION INTERVAL: [60 MINUTES] ← 320
```

FIG. 3C

STRATEGIC RESOURCE ALLOCATION IN A WEB-BASED COMPUTING SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network. In many cases, customers may make long-term reservations for some expected level of workload for each of several application types, and may rely on using (potentially more expensive) on-demand instances if and when the workload of any of the application types increases beyond the expected level.

BRIEF DESCRIPTION OF THE DRAWINGS

For a detailed description of various examples, reference will now be made to the accompanying drawings in which:

FIGS. 3A-3C show an illustrative dialogs for entry of spot instance request parameters in accordance with various examples.

DETAILED DESCRIPTION

Figure 1:
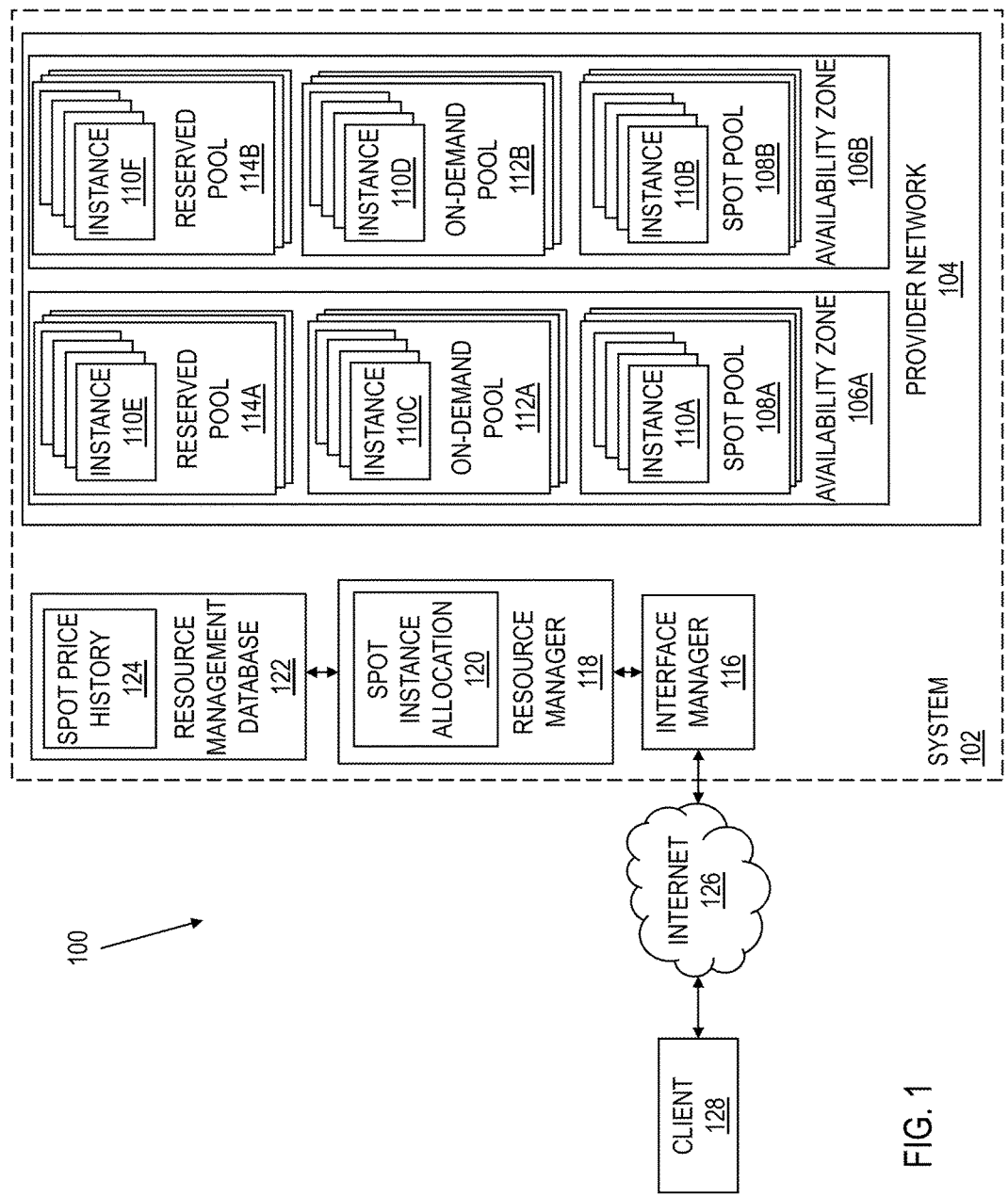
FIG. 1 shows an illustrative system environment in accordance with various examples.

Various embodiments of methods and apparatus for strategic allocation of network-accessible resources are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

In some embodiments a client or user may be provided direct access to a resource instance, e.g., by giving a user an administrator login and password. In other embodiments the provider network operator may allow clients to specify execution requirements for specified client applications, and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for the applications, without for example requiring the client to access an instance or an execution platform directly. A given execution platform may utilize one or more resource instances in some implementations; in other implementations multiple execution platforms may be mapped to a single resource instance.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Operators of such provider networks may in some instances implement a flexible set of resource reservation, control and access interfaces for their clients. For example, a resource manager of the provider network may implement a programmatic resource reservation interface (e.g., via a web site or a set of web pages) that allows clients to learn about, select, purchase access to, and/or reserve resource instances. It is noted that at least in some of the various embodiments discussed below, where an entity such as a resource manager is described as implementing one or more programmatic interfaces such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog, provide details and specifications of the different types or sizes of resources supported, the different reservation types or modes supported, pricing models, and so on. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for the instance; the client would be assured of having the reserved instance available for the term of the reservation. Using on demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client.

A resource assigned to a client based on the client's maximum specified unit cost (i.e., the client's "bid price") exceeding the dynamic market price of the resource may be termed an "interruptible instance" or "spot instance." The terms "interruptible instance" and "spot instance" may be used interchangeably herein. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance (an interruptible instance) that was previously allocated to the client may be reclaimed by the resource manager and may be allocated to some other client that is willing to pay a higher price. Other purchasing modes or combinations of modes may be implemented by the resource manager in some embodiments.

While use of interruptible instances to provide the computational capacity need to perform a task allows for potential reduction in overall costs, interruptible instances may be deallocated due to an increase in demand and accompanying increase in unit cost. The tolerance to interruption, due to deallocation of interruptible instances, may vary widely from task to task. For example, some tasks may not be time sensitive, and as such while interruption of the task by deallocation of interruptible instances may delay completion of the task, the task can be completed without consequence, other than time delay, when the unit cost of interruptible instances drops below the client specified maximum. Examples of time insensitive tasks may include scientific simulations and research.

Other tasks may be relatively insensitive to deallocation of a portion of the interruptible instances assigned to the task, but deallocation of all the interruptible instances assigned to the task may be unacceptable. For example, if a client's web servers are implemented via interruptible instances, then deallocation of all the interruptible instances may effectively shut down the client's web presence until the unit cost of interruptible instances drops below the client specified maximum. To maintain at least some capacity to perform the task, rather than assigning only interruptible instances to the task, at least some reserved or on-demand instances may be allocated to the task.

Yet other tasks may be very sensitive to interruption, such that deallocation of any of the interruptible instances assigned to a tack may be unacceptable. For example, if computation of a task is not structured to accommodate interruption, then the entire task may need to be restarted if a interruptible instance is deallocated. As a result, substantially and possibly unacceptable delay and expense may be incurred. Conventional strategies for managing interruption sensitive tasks include executing the task on reserved instances or on-demand instances.

To meet the demands of interruption sensitive applications while maintaining the cost advantages provided by use of interruptible instances, embodiments of the system and associated resource manager disclosed herein implement a variety of strategies for allocating interruptible instances that reduce the likelihood that all or any of the interruptible instances assigned to client are deallocated due to an increase in unit cost.

In some embodiments an interface manager (which, as noted earlier, may be incorporated within the resource manager, or may be external to the resource manager) may implement a programmatic interface, which may for example be exposed as one or more web pages, allowing clients to indicate interruptible instance allocation goals that the resource manager can use when selecting interruptible instances to be assigned to the client. Using such an interface, a client may in one implementation specify a number of interruptible instances to be allocated, a maximum unit cost to be paid for each interruptible instance, a strategy to be applied in selecting which interruptible instances to assign, a type of instances to assign, etc. For example, if interruption of a task to be executed on interruptible instances is not an issue, then the client may enter a relative low unit cost value and select allocation based on lowest cost. On the other hand, if a client's task is sensitive to loss of any of the interruptible instances executing the task, then the client may select an allocation strategy that seeks to minimize the likelihood that any interruptible instances assigned to the client at the unit cost selected by the client are deallocated. If some interruption is acceptable to a client's task, but it is important that the task remain active, i.e., that at least some interruptible instances remain allocated to the task, then the client may select an allocation strategy that seeks to allocate interruptible instances to the task from a number of different pools of interruptible instances. That is, the client may select an allocation strategy that diversifies the sources of the interruptible instances by allocating from a variety of pools, thereby reducing the risk that all the assigned interruptible instances will be deallocated due to an increase in unit cost.

Embodiments of the resource manager may also allow for reoptimization of interruptible instance allocation after a set of interruptible instances has been assigned to a client via an initial allocation. The reoptimization may be manually initiated by the client via a programmatic interface, or may be automatically executed by the resource manager based on parameters specified by the client and/or default parameters. A client may initiate reoptimization by, for example, selecting a radio button or other selection feature provided by a programmatic interface exposed to the client. Selection of reoptimization may cause the resource manager to re-execute the allocation strategy selected by the client, and select interruptible instances for assignment to the client based on the allocation strategy. The allocation strategy applied in the reoptimization may be the same as or different from the allocation strategy initially applied to select interruptible instances for assignment to the client. Selection of automatic reoptimization may include entry of one or more parameters that, when satisfied, trigger re-execution of the allocation strategy. For example, the resource manager may continually or periodically monitor the unit cost of interruptible instances, and a unit cost differential specified in association with selection of automatic reoptimization may trigger re-execution of the allocation strategy if the unit cost of available interruptible instances drops below the unit cost of interruptible instances currently allocated by more than the specified unit cost differential. Further details of the operations of resource manager in various embodiments are provided below in conjunction with the descriptions of FIGS. 1-11.

FIG. 1 shows an illustrative system environment 100 in accordance with various examples. The system environment 100 includes a system 102, in communication with a client 128 via the internet 126. The system 102 includes a provider network 104. The provider network 104 includes a plurality of resource instances 110, such as instances 110A, 110C, and 110E in availability zone 106A, and instances 110B, 110D and 110F in availability zone 106B. The various resource instances 110 of the different availability zones 106 may be reserved and/or allocated for use by clients (or potential clients) such as client 128. In the illustrated embodiment, system 102 also includes a resource manager 118, a resource management database 122, and an interface manager 116. As noted earlier, in some embodiments the functionality of the interface manager 116 may be implemented by a subcomponent of the resource manager 118. The interface manager 116 may in some embodiments implement one or more programmatic interfaces allowing client 128 to search for, browse, reserve and acquire instances 110 to obtain various types of services, e.g., to run and/or access various applications. In the illustrated embodiment, some or all of the instances 110 may be assigned to instance pools (based, for example, on instance categorization approaches illustrated in FIGS. 2A and 2B), such as reserved instance pools 114A or 114B, on-demand instance pools 112A or 112B, or spot instance pools 108A or 108B.

As shown in FIG. 1, each availability zone 106 may include multiple pools of each type. That is, each availability zone 106 may include multiple reserved pools 114, multiple on-demand pools 112, and/or multiple spot pools 108, where each pool 108, 112, and 114 may include multiple instances 110. The instances included in each pool 108, 112, 114 may differ from the instances included in each other pool 108, 112, 114 with respect the computing hardware applied by the instances 110, the operating systems executed by the instances 110, or other distinguishing differences. For example, the instances 110 of a first spot pool 108 may execute a WINDOWS operating system, while the instances 110 of a second spot pool 108 may execute a LINUX operating system. Similarly, each instance 110 of a third spot pool 108 may include two processor cores, while each instance 110 of a fourth spot pool 108 may include four processor cores. Thus, each of the pools 108, 112, 114 may be different with respect to the computing capabilities and features provided by the instances 110 assigned to the pool.

The pools 108, 112, 114 may represent logical collections or aggregations, so that, for example, the presence of two instances 110 in the same pool may not necessarily imply anything about the physical location of the hardware used for the two instances 110. Although the instances 110 illustrated in FIG. 1 are shown as belonging to availability zones 106, in other embodiments the provider network 104 may be organized differently: e.g., in some embodiments availability zones may not be implemented. Availability zones 106 may be grouped into geographic regions (not shown in FIG. 1) in some embodiments. Instance pools may be implemented within availability zones in some implementations (e.g., each availability zone may have its own reserved instance pool), while in other implementations an instance pool may span multiple availability zones.

Figure 2A:
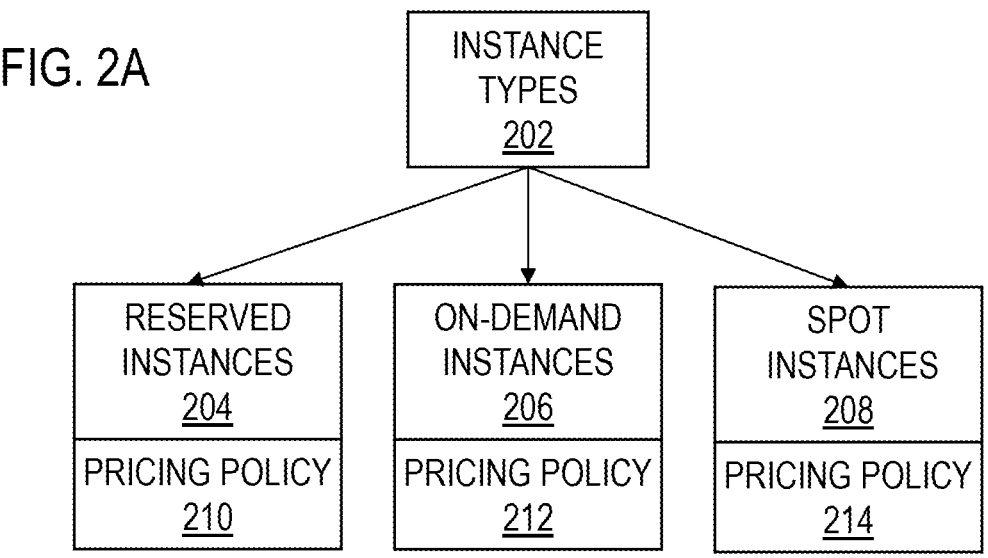
FIGS. 2A and 2B show illustrative resource instance classifications in accordance with various examples.
Figure 2B:
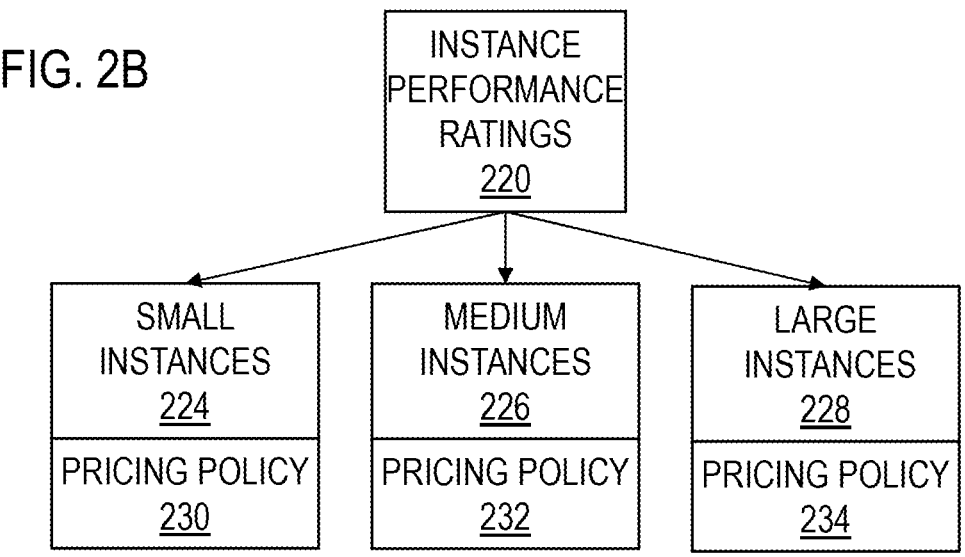

Each pool 108, 112, 114 may have an associated pricing policy for its instances 110. FIGS. 2A and 2B show illustrative resource instance classifications in accordance with various examples. FIG. 2A illustrates an approach in which instances are classified based in part on the timing or duration of instance allocations—i.e., on when instances are obtained by clients and when they are released by the clients. Three high-level types 202 of resource instances are shown: reserved instances 204, on-demand instances 206, and spot-instances 208, each with respective pricing policies 210, 212 and 214. In one embodiment, a client 128 may reserve an instance for fairly long periods, such as a one year term or a three-year term in accordance with the pricing policy 210, by paying a low, one-time, upfront payment for the instance, and then paying a low hourly rate for actual use of the instance at any desired times during the term of the reservation. Thus, the client 128 may, by making the long-term reservation, be assured that its reserved instance 204 will be available whenever it is needed.

If a client 128 does not wish to make a long-term reservation, the client may instead opt to use on-demand instances 206 or spot (interruptible) instances 208. The pricing policy 212 for on-demand instances 206 may allow the client 128 to pay for resource capacity by the hour with no long-term commitment or upfront payments. The client 128 may decrease or increase the resource capacity used, based on application needs, and may only have to pay the hourly rate for the instances used. In some cases the per-hour pricing for on-demand instances 206 may be higher than the hourly rate for reserved instances 204, because the relatively long durations of reservations may provide a more stable revenue stream to the operator of the provider network than the potentially more dynamic revenue stream provided by on-demand instances 206. Spot instances 208 may provide a third type of resource purchasing and allocation model. The spot pricing policy 214 may allow a client 128 to specify the maximum hourly price that the client 128 is willing to pay, and the resource manager 118 may set a spot price for a given set of resource instances 208 dynamically based on the prices clients are willing to pay and on the number of instances available to support the spot model. If a client 128's bid meets or exceeds the current spot price, an instance may be allocated to the client. If the spot price rises beyond the bid of the client using a spot instance 208, access to the spot instance 208 by the client may be revoked (e.g., the instance may be deallocated).

The prices of reserved instances 204, on-demand instances 206, and spot instances 208 may also vary based on the availability zones 106 or geographic regions in which the instances are located. The operator of provider network 104 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. Of course, the price for a given long-term reservation may typically remain unchanged once a client completes the reservation.

Instance pricing may also vary based on other factors. For example, in the case of compute instances, the performance capacities of different CPUs and other components of compute servers such as memory size may come into play. FIG. 2B shows an example classification of compute instances based on instance performance ratings 220. Large instances 228 may have more computing capacity than medium instances 226, which in turn may have more computing capacity than small instances 224. Accordingly, different pricing policies 230, 232 and 234 may be implemented for the different sizes of instances. In some embodiments, software features such as operating systems, hypervisors, middleware stacks and the like may also be taken into account in determining the pricing policies associated with various instances. For both compute instances and storage instances, storage device characteristics such as total storage capacity, supported I/O rates and the like may be used to develop pricing policies in some implementations. Pricing policies may also be determined by networking capabilities and networking usage (e.g., number of megabytes of data transferred, and/or the distances over which network traffic is transmitted). Other classification dimensions and techniques, including extensions of the basic hierarchies shown in FIGS. 2A and 2B, may be implemented in other embodiments. As shown in FIG. 1, the resource instances 110 of a provider network 104 may be organized as pools 108, 112, 114 based on, for example, which instances are currently being used as on-demand instances (e.g., pools 112A and 112B), which instances are reserved (e.g., pools 114A and 114B), which are currently available for spot allocation (e.g., pool 108A and 108B). Pricing for the instances 110 included in each pool 108, 112, 114, may be determined based, for example, on the various factors discussed above with regard to FIGS. 2A and 2B.

Some or all of the pricing information for the instances 110 may be stored in resource management database 122. In addition to current pricing information, the resource management database 122 may store price history information for the instances 110. More specifically, the resource management database 122 may store spot price history 124 that includes records indicating the historical unit cost for each instance 110 over time. For example, spot price history 124 may include unit cost information (e.g., maximum unit cost) for each interruptible instance 110A and 110B for each hour (or other interval) over the last year (or other duration). The resource manager 118 may retrieve the pricing information, including the spot price history 124 from the database 122 as needed to manage allocation and deallocation of interruptible instances 110. In particular, the resource manager 118 may retrieve and analyze the spot price history 124 to execute the spot instance allocation strategies disclosed herein.

The resource manager 118 includes spot instance allocation logic 120 to manage allocation and deallocation of interruptible instances 110 requested by the client 128. The resource manager 118, via the spot instance allocation logic 120, may apply any one of a variety of allocation strategies selected by the client 128 to determine which of the interruptible instances 110 are best suited to meet the needs of the client 128. Embodiments of the resource manager 118 may support at least a cost minimization (lowest cost) spot allocation strategy, a diversification spot allocation strategy, and an availability spot allocation strategy. The cost minimization allocation strategy seeks to minimize the cost of the interruptible instances 110 assigned to the client by identifying and assigning to the client 128 the interruptible instances 110 available at a lowest current unit cost. The diversification allocation strategy seeks to reduce the likelihood that all interruptible instances 110 assigned to the client 128 will be deallocated due to an increase in unit cost, by allocating interruptible instances 110 to the client from as many spot pools 108 as possible. The availability allocation strategy seeks to reduce the likelihood that any of the interruptible instances 110 assigned to the client 128 will be deallocated due to an increase in unit cost, by assigning interruptible instances to the client 128 from a spot pool 108 exhibiting historical pricing below the maximum unit cost bid by the client 128 for the interruptible instances 110.

FIGS. 3A-3C shows illustrative dialogs for entry of spot instance request parameters and initiation of spot instance allocation by the client 128 in accordance with various examples. FIG. 3A shows a dialog 300A illustrating selection of a lowest cost spot allocation strategy for selecting interruptible instances 110 to be assigned to the client 128. Selection of the lowest cost spot allocation strategy may be appropriate for execution of tasks that are tolerant of interruption, such as research computations. The dialog 300A includes a field 302 for entry of the number of interruptible instances 110 requested, a field 304 for entry of the type or types of instances to be allocated. For example, small, medium, and/or large instances (with reference to processor capacity, memory, etc.) may be selected. The dialog 300A also includes field 322 for entry of one or more availability zones in which the requested instances may be located, and field 324 for entry of a machine image applicable to the instances. The machine image may specify an operating system and other parameters of the instances. In some embodiments, different instance type selection parameters may be provided. For example, instance types may be selectable based on the different versions of each instance type provided over time. The dialog 300A also includes a field 306 for entry of the maximum unit cost (e.g., maximum amount per hour) the client 128 is willing to pay for each instance of the selected type.

In field 308, the allocation strategy to be applied in selecting the interruptible instances 110 for use by the client 128 is entered. In dialog 300A, the lowest cost allocation strategy has been selected. The resource manager 116 implements the lowest cost allocation strategy by retrieving current spot instance price information from the resource management database 122 and identifying the interruptible instances 110 meeting the client's instance parameters (e.g., as specified in instance type field 304), in various spot pools 108 and availability zones 106, having the lowest unit cost. If any of the identified lowest cost interruptible instances 110 are available at a unit cost below the maximum unit cost specified by the client 128 in field 306, then the resource manager 118 assigns to the client 128 up to the number of instances requested in field 302 that are available at lowest unit cost. If none of the identified lowest cost interruptible instances 110 are available at a unit cost below the maximum unit cost specified by the client 128 in field 306, then the resource manager 118 continues to monitor the current unit cost of the interruptible instances 110, and when the unit cost drops below the below the maximum unit cost of field 306, interruptible instances 110 are assigned to the client 128. For example, a pricing system (not shown) may periodically update the unit cost for each interruptible instance 110 based on supply and demand, and store the updated unit cost values in the resource management database 122 for access by the resource manager 118. The resource manager 118 may store spot instance request information in the resource management database 122 for use in determining the unit cost for each interruptible instance 110. For interruptible instances in general, when current unit cost of interruptible instances assigned to the client 128 rises above the maximum unit cost of field 306, the interruptible instances are deallocated from the client 128. The same or different interruptible instances may be reallocated to the client 128 when the current unit cost of available interruptible instances drops below the below the maximum unit cost of field 306.

The resource manager 118 may also provide automatic reoptimization of a spot instance allocation. The resource manager 118 may perform the reoptimization by reapplying the selected allocation strategy continuously, periodically, or as directed by the client 128. The dialog 300A may provide a field 320 via which the interval between reoptimization attempts is entered. Accordingly, for the lowest cost spot optimization strategy, the resource manager 116 may reoptimize the spot instance allocation by identifying interruptible instances 110 that are available at lower unit cost than the interruptible instances 110 currently assigned to the client 128, and replacing the currently allocated interruptible instances 110 with the lower unit cost interruptible instances 110. The dialog 300A also includes fields 312 and 314 that support automatic reoptimization. Field 312 allows automatic reoptimization to be enabled and disabled. Field 314 allows entry of a cost differential that triggers reoptimization by the resource monitor 118 if the unit cost of interruptible instances 110 currently allocated to the client 122 exceeds the cost of available interruptible instances 110 by the amount specified in field 314. Such a situation may occur if, for example, the unit cost of interruptible instances in one pool 108 drops due to reduced demand. Triggering reoptimization based on a specified cost differential can help ensure that currently allocated interruptible instances 110 are replaced only if a significant economic advantage can be achieved. Thus, the resource manager 116 may monitor the unit cost of currently available interruptible instances 110, and if the unit or total cost of interruptible instances 110 assigned to the client 128 exceeds the unit or total cost of currently available interruptible instances 110 by at least the cost differential value of field 314, then the resource manager 118 may assign the interruptible instances 110 available at lower cost to the client 128 and deallocate the currently assigned interruptible instances 110. If the cost of interruptible instances 110 of the same type, and in the same pool 108, as those currently assigned to the client 128 drops due to reduced demand, then some embodiments of the resource manager 118 may reduce the cost of the interruptible instances 110 assigned to the client 128 accordingly.

Figure 4A:
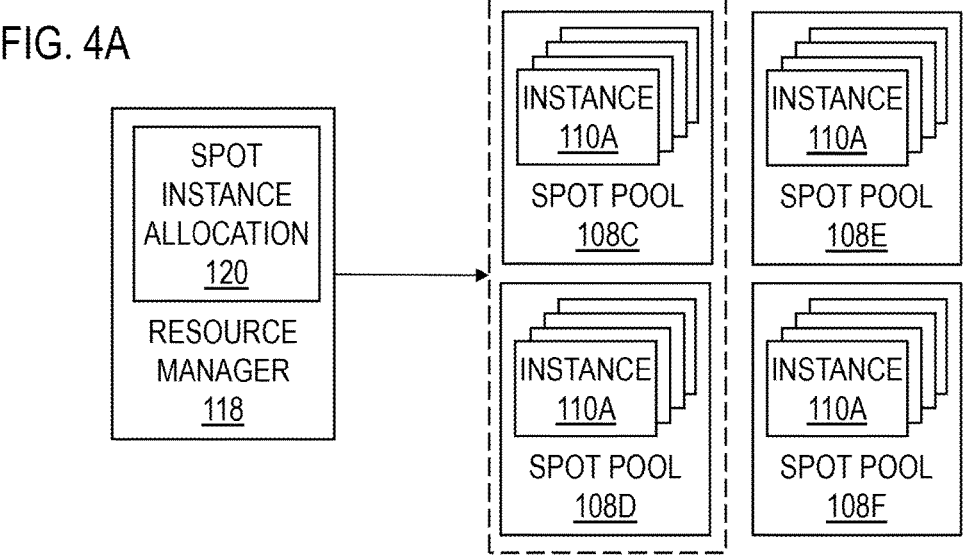
FIGS. 4A-4C show examples of spot instance selection using strategies disclosed herein.

FIG. 4A shows an example of selection of interruptible instances 110 using a cost minimization or lowest cost strategy. In FIG. 4A, the resource manager 118 has retrieved current interruptible instance 110 unit cost, availability, and specification information from the resource management database 122, and identified spot pools 108C, 108D, 108E, and 108F as including available interruptible instances 110 of the type specified by the client 128 and at a unit cost at or below the maximum unit cost specified by the client 128. Of the spot pools 108C, 108D, 108E, and 108F, the interruptible instances 110A of spot pool 108C are available at the lowest unit cost. The interruptible instances 110A of the spot pool 108D are available at a lower cost than the interruptible instances of spot pools 108E and 108F. Accordingly, the resource manager 118 may select the interruptible instances 110A of the spot pool 108C for allocation to the client 128. If the spot pool 108C lacks sufficient available instances 110A to satisfy the client's request, then the resource manager 118 may select additional interruptible instances 110A from spot pool 108D (the next lowest unit cost spot pool) for allocation to the client 128. Similarly, the resource manager 118 may select interruptible instances 110A from each successively higher priced spot pool 108 until all of the interruptible instances 110 requested by the client 128 have been allocated.

FIG. 3B shows a dialog 300B illustrating selection of a diversification spot allocation strategy for selecting interruptible instances 110 to be assigned to the client 128. The dialog 300B includes a field 302 for entry of the number of interruptible instances 110 requested, a field 304 for entry of the type of instance to be allocated, a field 322 for entry of one or more availability zones from which the instances are to be allocated, and a field 324 for entry of a machine image applicable to the requested instances. For example, small, medium, and/or large instances (with reference to processor capacity, memory, etc.) may be selected from designated availability zones and with particular machine images. In some embodiments, different instance type selection parameters may be provided. For example, instance types may be selectable based on the different versions of each instance type provided over time. The dialog 300B also includes a field 306 for entry of the maximum unit cost the client 128 is willing to pay for each instance of the selected type.

In field 308, the allocation strategy to be applied in selecting the interruptible instances 110 for use by the client 128 is entered. In dialog 300B, the diversity allocation strategy has been selected. The resource manager 116 implements the diversity allocation strategy by retrieving current spot instance unit cost information from the resource management database 122, and identifying all the spot pools 108 that include interruptible instances 110 that meet the clients instance specifications e.g., as specified in instance type field 304, availability zone field 322, and machine image field 324), and are available at a unit cost of no more than the client's maximum unit cost (as specified in filed 306). Some embodiments of the resource manager 118 may determine the number of pools 108 across which the requested instances are to be diversified. For example, the number of instance types selected times the number of availability zones selected may determine the number of pools across which the requested instances are diversified. Some embodiments of the dialog 300B may also provide a field that allows the client 128 to enter a number of spot pools 108 from which interruptible instances 110 are to be allocated to the client 128. In some embodiments, the dialog 300B may allow the client 128 to specify particular spot pools 108 (e.g., spot pool 108A, 108B, etc.). The resource manager 118 assigns the interruptible instances 110 to the client 128 from the identified spot pools 108. For example, if ten spot pools 108 have been identified as including interruptible instances 110 that meet the client's unit cost and instance specifications, and the client has requested allocation of ten interruptible instances, then the resource manager will assign to the client 128 one interruptible instance 110 from each of the identified ten spot pools 108. Similarly, if five spot pools 108 have been identified as including interruptible instances 110 that meet the client's unit cost and instance specifications, and the client has requested allocation of ten interruptible instances, then the resource manager will assign to the client 128 two interruptible instances 110 from each of the identified five spot pools 108. In some embodiments, the dialog 300B may allow for selection of maximized diversity, in which the resource manager 116 allocates interruptible instances 110 to the client 128 from as many pools 108 that meet the client's specifications as are identified by the resource manager 118.

Reoptimization in the context of the diversity spot allocation strategy may include the resource manager 118 monitoring pool 108 instance availability and unit cost, identifying additional pools 108 that include instances meeting the clients unit cost and instance specification requirements, and assigning instances from those additional pools to increase the diversification of assigned instances. For example, if instances were initially allocated from five pools 108, and instances 110 meeting the client's requirements are now available in five additional pools 108, then the resource manager 118 may assign interruptible instances 110 from the five additional pools 108 to bring the total number of pools 108 from which interruptible instances 110 are assigned to the client 128 to ten. Cost based reoptimization, as described with regard to the lowest cost allocation strategy, may also be applied the diversity spot allocation strategy while maintaining the level of pool 108 diversity specified by the client 128. That is, a reduction in unit cost that results in reduction in the number of pools 108 from which instances 110 are allocated may be unacceptable in some embodiments, while reduction in unit cost that maintains or increases the number of spot pools 108 from which instances are allocated to the client 128 may implemented in some embodiments.

Figure 4B:
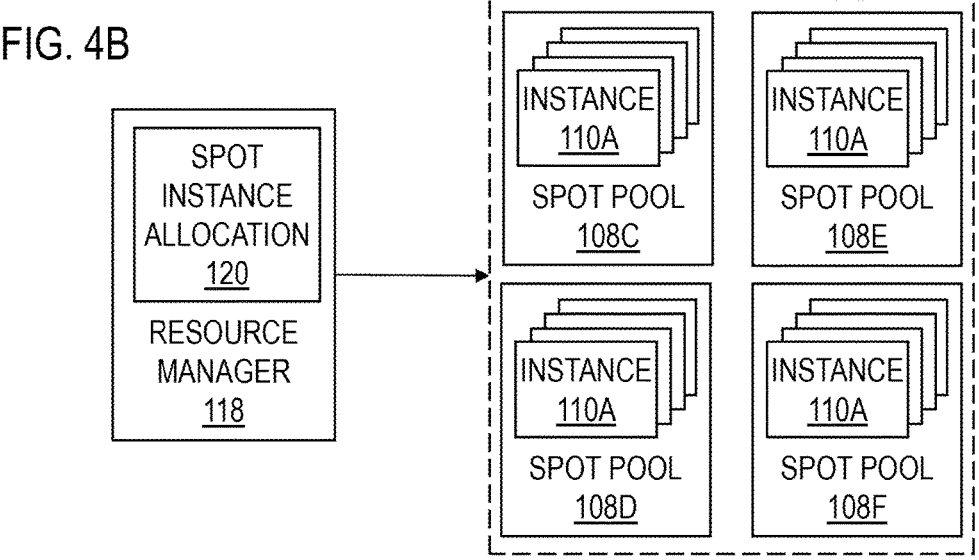

FIG. 4B shows an example of selection of interruptible instances 110 using a diversity strategy. In FIG. 4B, the resource manager 118 has identified spot pools 108C, 108D, 108E, and 108F as including available interruptible instances 110 of the type specified by the client 128 and at a unit cost at or below the maximum unit cost specified by the client 128. In order to maximize diversification of, and minimize the likelihood of deallocation of all of the interruptible instances 110A assigned to the client 128, the resource manager 118 may select at least some of the interruptible instances 110A for assignment to the client 128 from each of the spot pools 108C, 108D, 108E, and 108F. For example, if eight interruptible instances 110A have been requested by the client 128, then the resource manager 118 may select two interruptible instances from each of spot pools 108C, 108D, 108E, and 108F for allocation to the client 128.

FIG. 3C shows a dialog 300C illustrating selection of an availability spot allocation strategy for selecting interruptible instances 110 to be assigned to the client 128. The dialog 300C includes a field 302 for entry of the number of interruptible instances 110 requested, a field 304 for entry of the type of instance to be allocated, a field 322 for entry of one or more availability zones from which the instances are to be allocated, and a field 324 for entry of a machine image applicable to the requested instances. For example, small, medium, or large instances (with reference to processor capacity, memory, etc.) may be selected. In some embodiments, different instance type selection parameters may be provided. For example, instance types may be selectable based on the different versions of each instance type provided over time. The dialog 300C also includes a field 306 for entry of the maximum unit cost the client 128 is willing to pay for each instance of the selected type.

In field 308, the allocation strategy to be applied in selecting the interruptible instances 110 for use by the client 128 is entered. In dialog 300C, the availability allocation strategy has been selected. The dialog 300C may also include a field 318 via which an expected duration of the spot instance allocation is entered. The resource manager 118 may apply the duration value of field 318 to select a pool 108 that includes interruptible instances 110 likely to be available for at least the duration value. The resource manager 116 implements the availability allocation strategy by retrieving current spot instance unit cost information and spot price history 124 from the resource management database 122, and analyzing the spot price history 124 to determine which of the spot pools 108 offers the highest likelihood that, if the client specified number of interruptible instances 110 were to allocated from the pool 108, none of the instances would be deallocated, due to an increase in unit cost, prior to completion of execution of a task (e.g., prior to expiration of the specified time duration).

The resource manager 118 may implement the availability strategy by first identifying the spot pools 108 that include enough available interruptible instances 110 to fulfill the client's request, where the available interruptible instances 110 meet the client's unit cost and instance specifications. The resource manager 118 may analyze the identified spot pools 108 to determine which of the identified spot pools 108 may provide the greatest longevity at the unit cost specified by the client 128. The analysis may include applying the spot price history 124 for each pool to simulate (or perform a dry run of) spot pricing in each pool, with allocation of the client's requested instances from the pool, over a designated past time period (e.g., 30 days) to determine, given the conditions of the designated time period, longevity of the client's interruptible instances. The pools 108 shown to provide longevity meeting the client's specified duration may be ranked according to longevity and/or unit cost. For example, in some embodiments, the resource manager 118 may select the pool 108 providing the greatest longevity as the pool from which all of the interruptible instances 110 requested by the client 128 are to be allocated. In other embodiments, the resource manager 118 may select the one of the pools 108 providing adequate longevity at lowest unit cost as the pool from which all of the interruptible instances 110 requested by the client 128 are to be allocated. The dialog 3C may provide a field or control 310 for input of tolerance to instance loss by the task to be executed by the requested interruptible instances. For example, if a task exhibits very low tolerance to deallocation of an instance during execution, then the resource manager 118 may select the pool 108 providing greatest longevity to minimize the likelihood of instance deallocation due to an increase in unit cost. On the other hand, if the a task exhibits a high tolerance to deallocation of an instance during execution, then the resource manager 118 may select a pool 108 providing adequate longevity at lower relative cost and with a slightly higher likelihood of instance deallocation due to an increase in unit cost.

In some embodiments, the resource manager 118 may allocate interruptible instances 110 from multiple pools 108 using the availability spot allocation strategy. For example, if no single pool 108 can provide all the interruptible instances 110 requested with sufficient longevity, then rather than waiting for a sufficient interruptible instances having adequate longevity to become available in a single pool 108, the resource manager 118 may allocate some interruptible instances from a first pool 108 deemed to provide adequate longevity, and other interruptible instances from a second pool 108 deemed to provide adequate longevity.

Reoptimization in the context of the availability spot allocation strategy may include the resource manager 118 identifying pools 108 that lacked availability at the time the instances 110 were assigned to the client 128, and determining whether the previously unconsidered pools 108 provide a longevity or unit cost advantage over the pool 108 of the currently assigned interruptible instances 110. If a sufficient advantage in longevity and/or cost is identified, then the resource manager 118 may migrate the executing task to instances of the newly selected pool 108.

In reoptimization under any of the spot instance allocation strategies (e.g., lowest price, diversity, or availability), the resource manager 118 may assign any new interruptible instances 110 to the client 128 prior to deallocation of the current interruptible instances 110 to ensure availability should spot instance unit cost change prior to transfer of execution from the current to new interruptible instances.

Figure 4C:
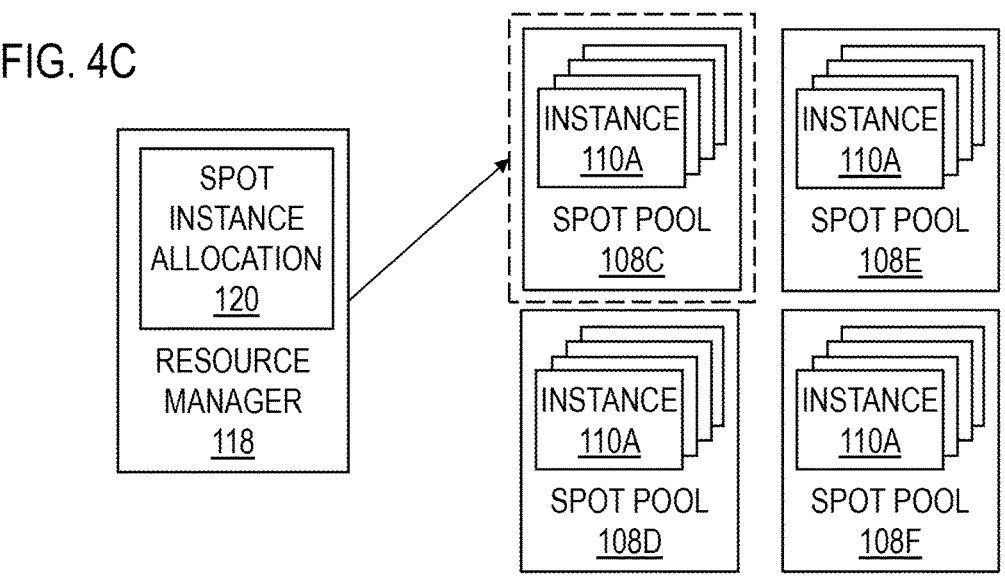

FIG. 4C shows an example of selection of interruptible instances 110 using an availability strategy. In FIG. 4C, the resource manager 118 has identified spot pools 108C, 108D, 108E, and 108F as including available interruptible instances 110 (e.g., the number of interruptible instances 110A requested by the client 128) of the type specified by the client 128 and at a unit cost at or below the maximum unit cost specified by the client 128. The resource manager 118 estimates the longevity of the interruptible instances 110A in each pool 108 at the maximum unit cost specified by the client 128. For example, the resource manager 118 may analyze the historical spot price changes for each spot pool 108C, 108D, 108E, and 108F based on the spot price history 124 for each spot pool 108 stored in the resource management database 122 to determine an estimated life for the interruptible instances 110A in each spot pool 108 at the client specified maximum unit cost. In FIG. 4C, the resource manager 118 has determined that spot pool 108C provides the highest potential longevity for the interruptible instances 110A at the client specified maximum unit cost. Accordingly, the resource manager 118 may select all of the interruptible instances 110A requested by the client 128 from spot pool 108C.

Figure 5:
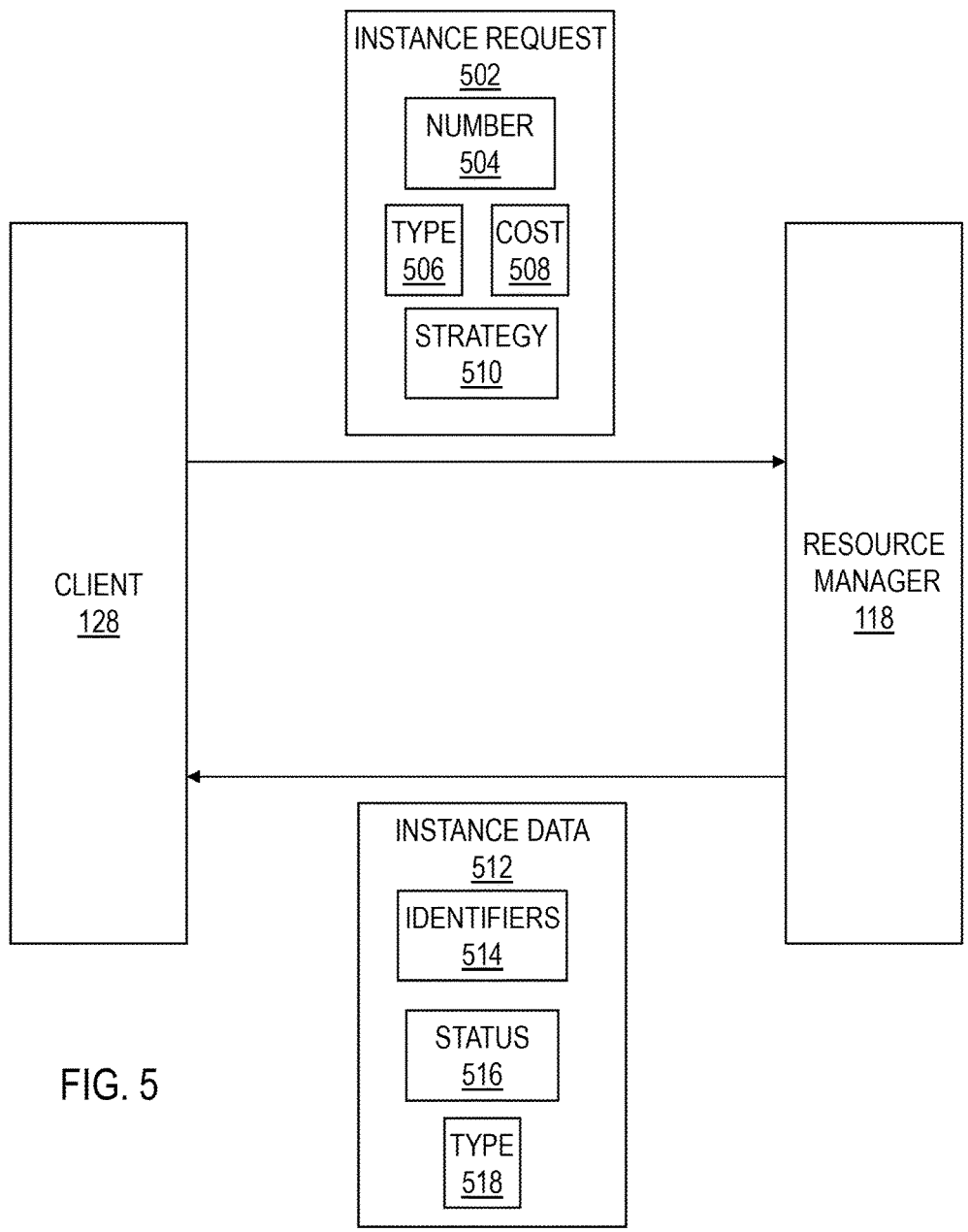
FIG. 5 shows spot instance request interaction between and client and resource manager in accordance with various examples.

FIG. 5 illustrates a submission of a spot instance allocation request 502 by a client 128 to a resource manager 118, in accordance with various examples. As shown in FIGS. 3A-3C, the client 128 may specify various parameters for controlling spot instance allocation that are included in the spot instance allocation request 502, including a number of interruptible instances 504 to be allocated to the client 128, the type of instances 506, the maximum unit cost 508 the client 128 is willing to pay for each interruptible instance, and an allocation strategy 510 to be applied in selecting the interruptible instances 110. The request 502 may be submitted via the dialogs 300A, 300B, 300C or other parameter transfer mechanisms provided by a programmatic interface. The request 502 may include various other parameter (not shown) related to management of interruptible instance 110 allocation entered via the dialogs 300A, 330B, 300C.

In response to receiving the spot instance allocation request 502, the resource manager 118 may apply the allocation strategy specified in the request 502 to select interruptible instances 110 to assign to the client 128. The resource manager 118 store the various parameters included in the allocation request in persistent storage (e.g., the resource management database 122), and apply the parameters to select and assign interruptible instances 110 for use by the client 128. In the illustrated embodiment the resource manager 118 transmits a response 512 back to the client 128. The response 512 includes identifiers for each of the interruptible instances 110 assigned to the client 128, the status of each of the interruptible instances (e.g., running, halted, etc.), and identification of the type of each interruptible instance. Some embodiment may provide additional information, such the identifier of each pool 108 associated with an allocated interruptible instance 110.

Figure 6:
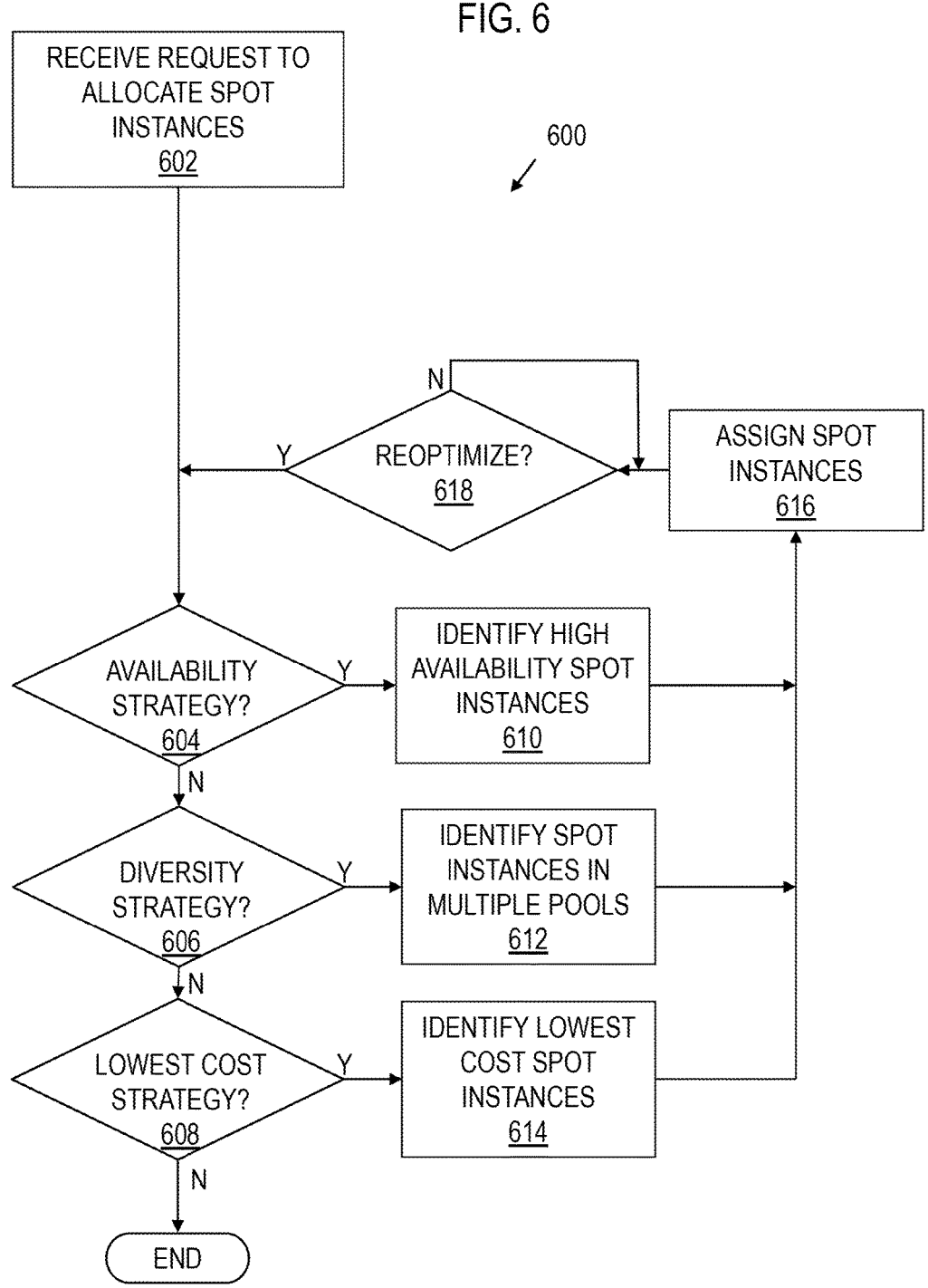
FIG. 6 shows a flow diagram for a method for allocating spot instances in accordance with various examples.

FIG. 6 shows a flow diagram for a method 600 for allocating interruptible instances in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by a computer of the system 102.

In block 602, the resource manager 118 receives a request 502, from the client 128, to allocate interruptible instances 110. The request 502 may specify the number of interruptible instances 110 to be allocated, parameters of the instances to allocated (e.g., a type of instance to be allocated), a maximum unit cost that the client 128 is willing to pay for each interruptible instance 110, an allocation strategy to applied for selecting the interruptible instances 110 to be assigned to the client 128, various parameters relevant to the specified allocation strategy, reoptimization parameters, etc.

In blocks 604-608, the resource manager 118 determines which allocation strategy is to be applied to select the interruptible instances 110 to be assigned to the client 128. In block 604, the resource manager 118 determines whether the availability strategy is to be applied to reduce the likelihood that any of the interruptible instances 110 assigned to the client 128 will be deallocated prior to task completion. If in block 604, the resource manager 118 determines that the availability strategy is to be applied to select the interruptible instances 110 to be assigned to the client 128, then in block 610, the resource manager 118 identifies interruptible instances 110 that have the best potential availability to assign to the client 128. Additional details of the spot instance selection process performed by the resource manager 118 to implement the availability allocation strategy are provided by reference to FIG. 7 and associated description.

If, in block 604, the resource manager 18 determines that the availability strategy is not to be applied, then in block 606, the resource manager 118 determines whether the diversity strategy is to be applied to reduce the likelihood that all of the interruptible instances 110 assigned to the client 128 will be deallocated prior to task completion. If in block 606, the resource manager 118 determines that the diversity strategy is to be applied to select the interruptible instances 110 to be assigned to the client 128, then in block 612, the resource manager 118 identifies interruptible instances 110 in multiple pools 108 that meet the client's cost and instance specification requirements to assign to the client 128. Additional details of the spot instance selection process performed by the resource manager 118 to implement the diversity allocation strategy are provided by reference to FIG. 9 and associated description.

If, in block 606, the resource manager 118 determines that the diversity strategy is not to be applied, then in block 608, the resource manager 118 determines whether the lowest cost strategy is to be applied to minimize the unit cost of the interruptible instances 110 assigned to the client 128. If in block 508, the resource manager 118 determines that the lowest cost strategy is to be applied to select the interruptible instances 110 to be assigned to the client 128, then in block 614, the resource manager 118 identifies the lowest cost interruptible instances 110 in the spot pools 108 that meet the client's cost and instance specification requirements to assign to the client 128. Additional details of the spot instance selection process performed by the resource manager 118 to implement the lowest cost strategy are provided by reference to FIG. 8 and associated description.

In block 616, the interruptible instances 110 selected for assignment to the client 128, using any of the availability, diversity, or lowest cost allocation strategies, are assigned to the client 128. In some embodiments, the resource manager 118 transmits a response 512 to the client 128. As explained with regard to FIG. 5, the response 512 identifies the interruptible instances 110 assigned to the client 128. Assigning the interruptible instances 110 to the client 128 may include configuring the interruptible instances 110 for configuration by the client 128. For example, the interruptible instances 110 may be configured to receive programming provided by the client 128.

In block 618, the resource manager 118 determines whether to reoptimize the spot instance allocation. If reoptimization is not to be performed, then the resource manager 118 waits until reoptimization is to be performed. For example, reoptimization may be triggered based on time or a change in instances available for allocation. If reoptimization is to be periodically performed based on a time interval value specified by the client 128, as shown in field 320 of FIG. 3A, then the resource manager 118 will delay until the interval has expired, and then attempt reallocation of interruptible instances in accordance with the selected allocation strategy in blocks 604-616. If reoptimization is triggered based on a condition (e.g., unit cost differential, increased diversity, or increased availability), then the resource manager 118 will delay until the condition is satisfied, and thereafter attempt reallocation of interruptible instances in accordance with the selected allocation strategy in blocks 604-618. Additional details of the reoptimization process performed by the resource manager 118 are provided by reference to FIG. 10 and associated description.

Figure 7:
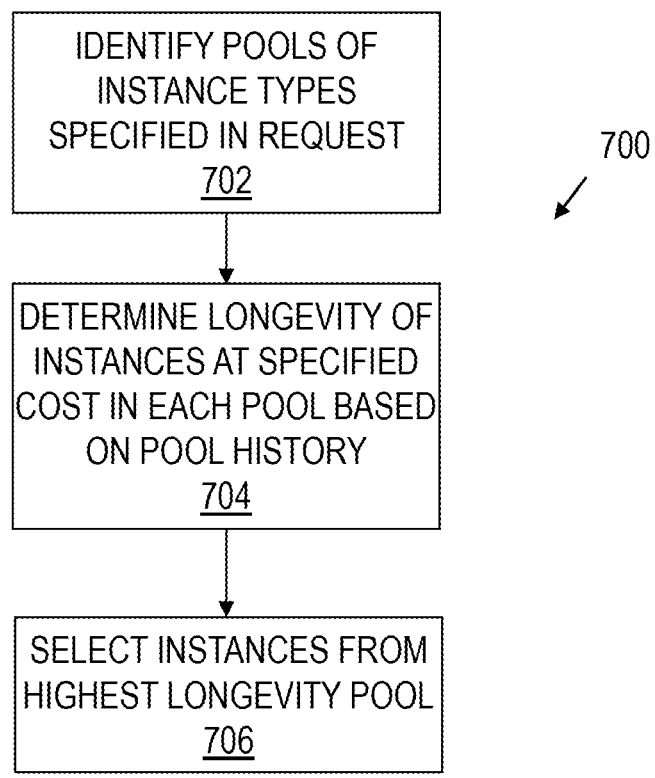
FIG. 7 shows a flow diagram for a method for selecting spot instances based on availability in accordance with various examples.

FIG. 7 shows a flow diagram for a method 700 for selecting interruptible instances based on an availability strategy in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 700 may be provided by instructions executed by a computer of the system 102. The method 700 may be performed by the resource manager 118 as part of the operations of block 610 of FIG. 6.

In block 702, the resource manager 118 identifies spot pools 108 that include interruptible instances 110 of the type specified in the spot instance allocation request received from the client 128 that are available for allocation at no more than the maximum unit cost specified in the spot instance allocation request. Of the spot pools 108 that include instances of the specified instance type and unit cost, the resource manager 118 may further identify the spot pools 108 that include at least the number of instances requested by the client 128 available for allocation. Some embodiments of the resource manager 118 may attempt to assign the requested number of interruptible instances from a single pool. Other embodiments of the resource manager 118 may assign the requested number of instances from multiple pools if no single pool includes the requested number of instances, or if potential longevity benefits from allocation from multiple pools 108.

In block 704, the resource manager 118 determines the longevity of the interruptible instances 110 requested by the client 128 in each of the identified spot pools 108. The resource manager 118 may determine the longevity of the requested interruptible instances based on the spot price history 124 stored in the resource management database 123. For example, the resource manager 118 may retrieve the spot price history 124 of each identified spot pool 108 over a predetermined time interval (e.g., 30 days). The resource manager 118 may analyze the spot price history 124 of each pool 108 to estimate how long the number of interruptible instances 110 requested by the client 128 would have been assigned to the client at the maximum client specified unit cost without deallocation due to a rise in unit cost due to changes in supply and demand. In one embodiment, the resource manager 118 may estimate the spot instance longevity in a spot pool 108 as the average lifetime of interruptible instance 110 allocated at the maximum unit cost specified by the client 128 over the interval. In some embodiments, the resource manager 118 may simulate allocation of the requested number of interruptible instances 110 from a spot pool 108 and determine the longevity of the interruptible instances at the maximum unit cost specified by the client 128. That is, the resource manager 118 may execute a dry run of the spot pool 108 that includes the requested number of interruptible instances 110 at the specified maximum unit cost, where the dry run applies the changes is unit cost in the pool 108 recorded in the spot price history 124 for the pool 108. The longevity of the number of interruptible instances 110 at the specified maximum unit cost may be determined to be the time that interruptible instances 110 remain allocated given the unit cost fluctuations recorded as occurring in the spot price history 124 for the pool 108.

In block 706, the resource manager 118 selects one or more of the spot pools 108 from which to allocate the interruptible instances 110 requested by the client 128. The resource manager 118 may select a single pool 108 identified in block 604 as providing longevity for the interruptible instances 110 that exceeds that provided by any other pool 108 and that includes a sufficient available instances to satisfy the client's request. Alternatively, the resource manager 118 may select the requested number of interruptible instances 110 from a number of different pools 108 if none of the spot pools 108 includes sufficient available interruptible instances at a longevity that equals or exceed that attainable by dividing the requested number of instances across multiple spot pools 108.

Tolerance to instance loss, as specified in the client's request, may also be considered in selecting the interruptible instances 110 assigned to the client 128. For example, potential longevity of selected interruptible instances 110 may inversely correspond to specified tolerance to instance loss. That is, low tolerance to instance loss may dictate assignment of interruptible instances 110 deemed to provide highest potential availability regardless of relative unit cost, while higher tolerance to instance loss may allow for some flexibility in assignment of interruptible instances 110 deemed to provide lower, but adequate, potential availability at a lower unit cost.

Figure 8:
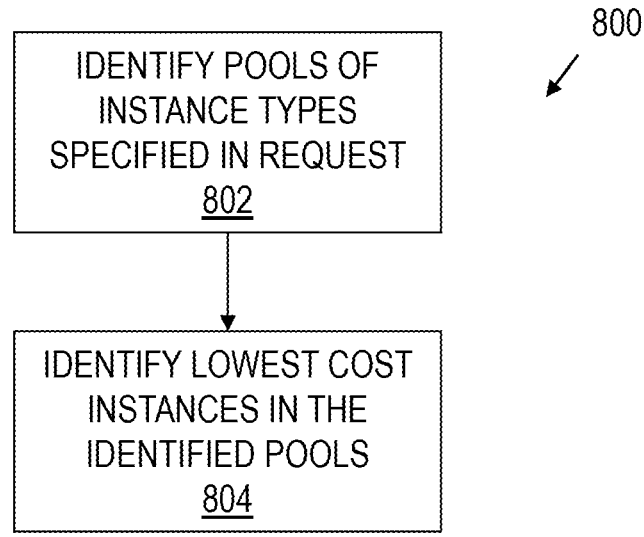
FIG. 8 shows a flow diagram for a method for selecting spot instances based on lowest cost in accordance with various examples.

FIG. 8 shows a flow diagram for a method 800 for selecting interruptible instances based on a lowest cost allocation strategy in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 800 may be provided by instructions executed by a computer of the system 102. The method 800 may be performed by the resource manager 118 as part of the operations of block 614 of FIG. 6.

In block 802, the resource manager 118 identifies spot pools 108 that include interruptible instances 110 of the type specified in the spot instance allocation request received from the client 128. For example, the spot instance allocation request received from the client 128 may specify that only interruptible instances 110 that include a specific microprocessor, and/or a specific amount of memory, and/or a specific build revision be assigned responsive to the request. The resource manager 118 may retrieve spot pool and instance information from the resource management database 122, and analyze the information for each spot pool 108 to determine which of the spot pools 108 include the requested type of interruptible instances 110.

In block 804, the resource manager 118 retrieves, from the resource management database 112, current unit cost for the specified instance type in each of the identified spot pools 108, and identifies which of the spot pools 108 offers the requested instance type at the lowest unit cost. For example, the resource manager 108 may rank the spot pools 108 in order of unit cost for the specified instance type from lowest to highest. The resource manager 118 may select the interruptible instances 110 to be assigned to the client 128 from the spot pool(s) 108 offering lowest cost, such that as many interruptible instances as are available are allocated from the spot pool offering lowest cost and any additional interruptible instances are allocated from the spot pool offering the next lowest cost, etc.

Figure 9:
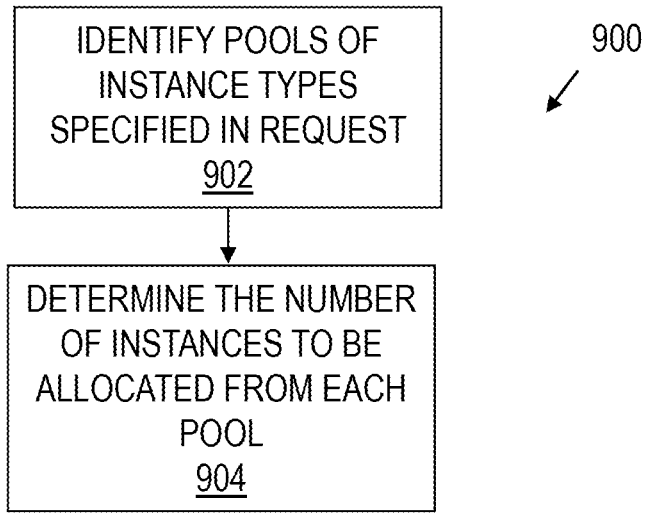
FIG. 9 shows a flow diagram for a method for selecting spot instances based on diversification in accordance with various examples.

FIG. 9 shows a flow diagram for a method for selecting interruptible instances based on a diversity allocation strategy in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 900 may be provided by instructions executed by a computer of the system 102. The method 900 may be performed by the resource manager 118 as part of the operations of block 612 of FIG. 6.

In block 902, the resource manager 118 identifies spot pools 108 that include interruptible instances 110 of the type specified in the spot instance allocation request received from the client 128. For example, the spot instance allocation request received from the client 128 may specify that only interruptible instances 110 that include a specific microprocessor, and/or a specific amount of memory, and/or a specific build revision be assigned responsive to the request. The resource manager 118 analyzes each spot pool 108 to determine which of the spot pools 108 include the requested type of interruptible instances 110.

In block 904, the resource manager 118 determines the number of interruptible instances 110 to be allocated from each of the identified spot pools 108. In selecting the spot pools 108 from which instances 110 are to be allocated to the client 128, the resource manager 118 may seek to maximize the number of spot pools 108 to which the requested interruptible instances 110 are allocated, thereby reducing the likelihood that all of the assigned interruptible instances 110 will be deallocated due increased unit cost. For example, if the client 128 has requested allocation of ten interruptible instances 110, and five spot pools 110 have been identified as including interruptible instances 110 of the type requested by the client 128, then the resource manager 118 may select two interruptible instances from each of the five spot pools 108 to allocate to the client 128. Similarly, if the client 128 has requested allocation of ten interruptible instances 110, and eight spot pools 110 have been identified as including interruptible instances 110 of the type requested by the client 128, then the resource manager 118 may select, for allocation to the client 128, one interruptible instance from each of six of the spot pools 108, and select two interruptible instances 110 from the seventh and eighth identified spot pools 108. In some embodiments, if more interruptible instances are to be allocated from one spot pool 108 than from another spot pool 108, the resource manager 110 may select a spot pool 108 offering a lower unit cost as the spot pool 108 from which the greater number of interruptible instances 110 is to be allocated.

Figure 10:
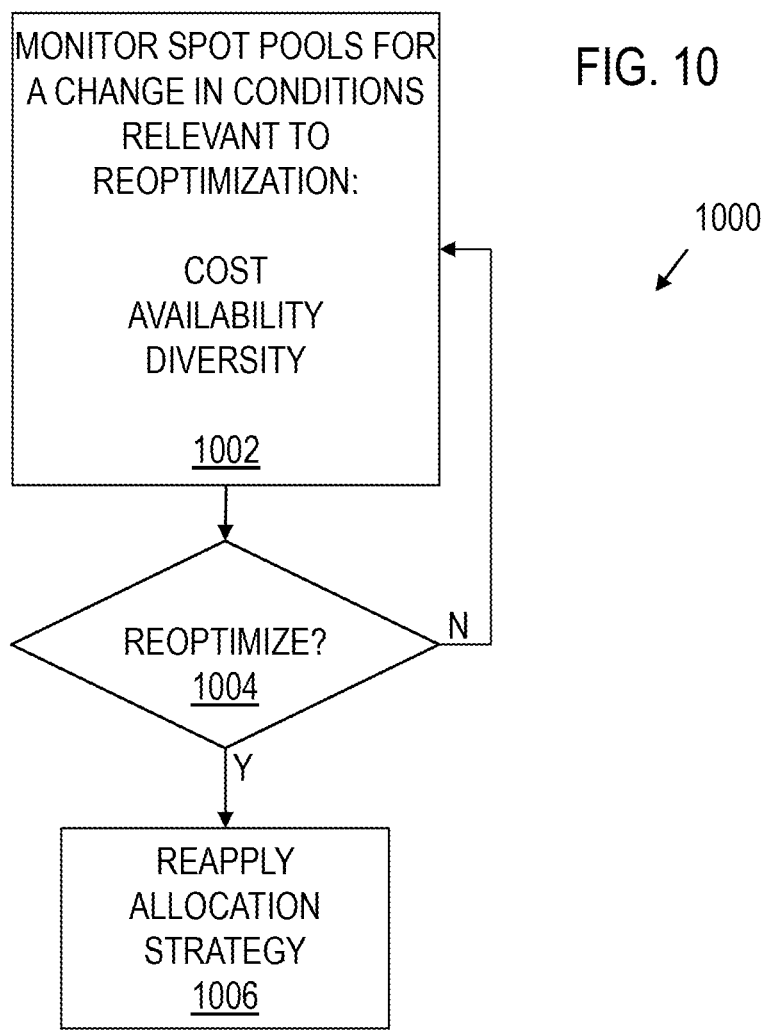
FIG. 10 shows a flow diagram for a method for reallocating or reoptimizing assignment of spot instances in accordance with various examples.

FIG. 10 shows a flow diagram for a method 1000 for reallocating or reoptimizing assignment of interruptible instances in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 1000 may be provided by instructions executed by a computer of the system 102. The method 1000 may be performed by the resource manager 118 as part of the operations of block 618 of FIG. 6.

In block 1002, the resource manager 118 monitors the spot pools 108 for a change in condition that may trigger reoptimization. The monitoring may include retrieving unit cost, spot price history, and availability information from the resource management database 122, and analyzing the information to determine whether an advantage can be gained by changing which interruptible instances 110 are assigned to the client 128. For example, if a change in unit cost is selected to trigger reoptimization, then the resource manager 118 may monitor unit cost of interruptible instances 110 of the type assigned to the client 128. If the availability strategy has been applied to select the interruptible instances 110 assigned to the client 128, then the resource manager 118 may monitor the availability and estimated longevity of instances of the type assigned to the client 128 across the spot pools 108.

If the diversity strategy has been applied to select the interruptible instances 110 assigned to the client 128, then the resource manager 118 may monitor the availability of instances of the type assigned to the client 128 in spot pools 108 from which interruptible instances 110 are currently not allocated to the client 128, and in spot pools 108 from which fewer than a desired number of interruptible instances 110 are currently assigned to the client. For example, if availability at the time of initial allocation dictated that five interruptible instances be allocated from a first spot pool 108, and one interruptible instance 110 be allocated from each of five other spot pools 110, then the resource manager 118 may seek to reduce the number of interruptible instances 110 allocated from the first spot pool by identifying available instances in one of the other five spot pools 110 or in spot pools 110 in which no instances were available at the time of initial allocation.

In block 1004, the resource manager 118 determines whether conditions in the spot pools 108 have changed sufficiently to trigger reoptimization. For example, if reoptimization is based, at least in part, on a change in cost, then the resource manager 118 may determine whether a difference in cost of assigned interruptible instances 110 exceeds cost of available interruptible instances by more than a predetermined cost differential (e.g., the reoptimization cost differential of field 314). If the difference in cost of assigned interruptible instances 110 exceeds cost of available interruptible instances by more than a predetermined cost differential, then the resource manager 118 may reapply the selected allocation strategy in block 1006 to allocate new interruptible instances 110, and migrate the executing task from the currently assigned interruptible instances 110 to the newly allocated interruptible instances 110. For example, any available allocation strategy may consider unit cost as a primary or secondary factor in selecting which instances are assigned to the client 128.

If the availability strategy was applied to select the interruptible instances 110 initially assigned to the client 128, then the resource manager 118 may trigger reoptimization if monitoring for availability indicates that a spot pool 108 or set of spot pools 108 may provide a higher level of availability (e.g., greater longevity) than the spot pool(s) 108 from which the interruptible instances 110 are currently assigned to the client 128. For example, if the resource manager 118 is to allocate all the interruptible instances 110 from a single highest availability pool 108, and at the time of initial allocation the interruptible instances are allocated from a first pool having sufficient available interruptible instances and exhibiting highest estimated longevity of all spot pools 108 that have sufficient available interruptible instances 110. After initial allocation, sufficient instances may become available in a second spot pool 108 that provides higher estimated longevity that the first spot pool 108. The higher estimated longevity of the instances in the second spot pool may trigger reoptimization by reapplication of the availability strategy in block 1006.

If the diversity strategy was applied to select the interruptible instances 110 initially assigned to the client 128, then the resource manager 118 may trigger reoptimization if monitoring for diversity indicates that a reallocation of the interruptible instances 110 would provide greater diversity than the current allocation. For example, if an initial application of the diversity strategy, by the resource manager 118, identified four spot pools from which to allocate a total of ten interruptible instances 110, and the monitoring of block 1002 now indicates that the ten interruptible instances 110 may now be allocated from eight spot pools 108 (i.e., four additional spot pools 108 now include available interruptible instances 110), then the resource manager 118 may trigger reoptimization by reapplication of the diversity strategy in block 1006.

Figure 11:
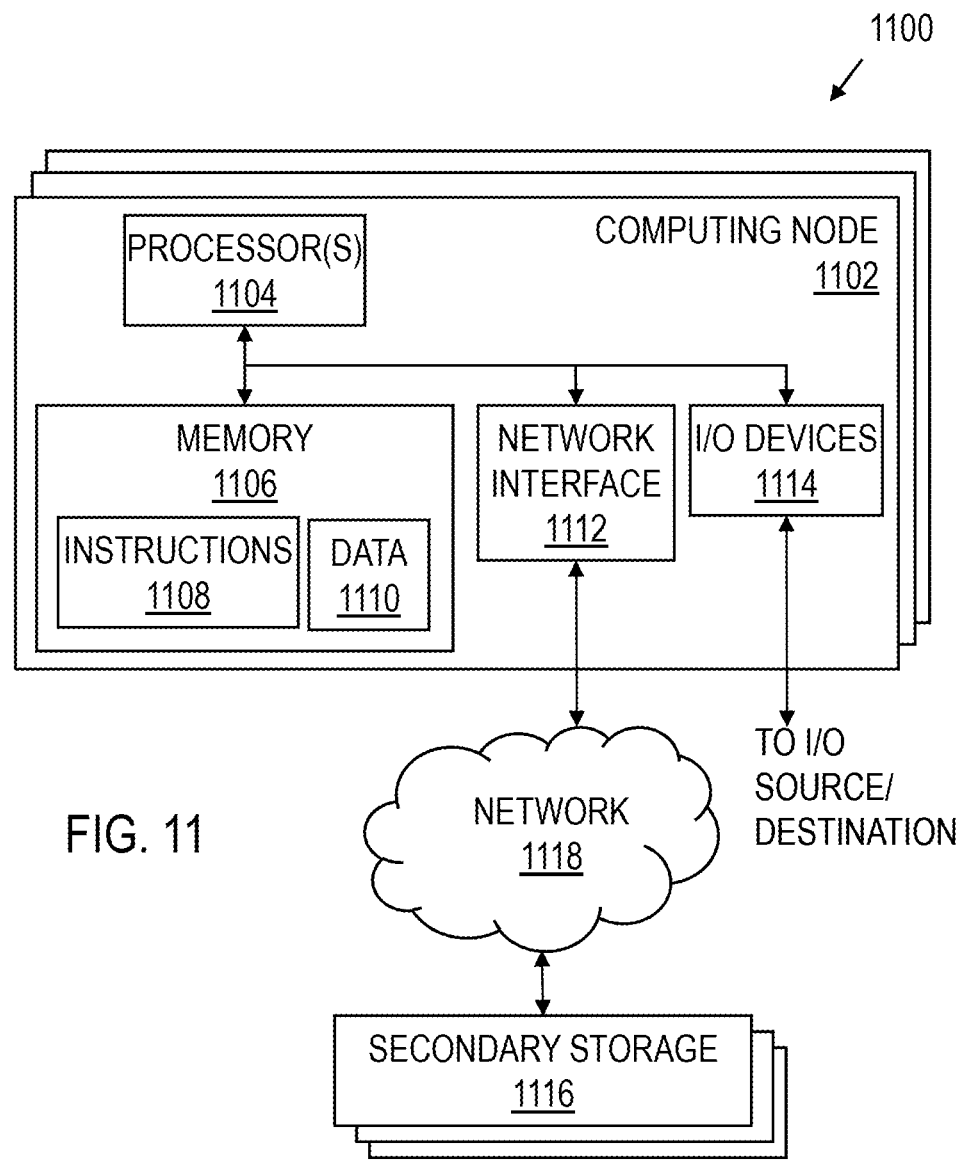
FIG. 11 shows a schematic diagram for a computing system suitable for implementation of spot instance allocation strategies in accordance with various examples.

FIG. 11 shows a schematic diagram for a computing system suitable for implementation of spot instance allocation strategies in accordance with various examples. The computing system 1100 includes one or more computing nodes 1102 and secondary storage 1116 that are communicatively coupled via a network 1118. One or more of the computing nodes 1102 and associated secondary storage 1116 may be applied to provide the functionality of the system 102, including the resource manager 116, the resource management database 122, and the instances 110, and other components of the system 102.

Each computing node 1102 includes one or more processors 1104 coupled to memory 1106, network interface 1112, and I/O devices 1114. In some embodiments of the system 100, a computing node 1102 may implement the functionality of more than one component of the system 100. In various embodiments, a computing node 1102 may be a uniprocessor system including one processor 1104, or a multiprocessor system including several processors 1104 (e.g., two, four, eight, or another suitable number). Processors 1104 may be any suitable processor capable of executing instructions. For example, in various embodiments, processors 1104 may be general-purpose or embedded microprocessors implementing any of a variety of instruction set architectures (ISAs), such as the x86, PowerPC, SPARC, or MIPS ISAs, or any other suitable ISA. In multiprocessor systems, each of processors 1104 may commonly, but not necessarily, implement the same ISA. Similarly, in a distributed computing system such as one that collectively implements the system 102, each of the computing odes 1102 may implement the same ISA, or individual computing nodes and/or replica groups of nodes may implement different ISAs.

The memory 1106 may include a non-transitory, computer-readable storage medium configured to store program instructions 1108 and/or data 1110 accessible by processor(s) 1104. The system memory 1106 may be implemented using any suitable memory technology, such as static random access memory (SRAM), synchronous dynamic RAM (SDRAM), nonvolatile/Flash-type memory, or any other type of memory. Program instructions 1108 and data 1110 implementing the functionality disclosed herein are stored within system memory 1106. For example, instructions 1108 may include instructions that when executed, by processor(s) 1104 implement the resource manager 116, the resource management database 122, the instances 110, and other systems and components disclosed herein.

Secondary storage 1116 may include volatile or nonvolatile storage and storage devices for storing information such as program instructions and/or data as described herein for implementing the stem 102. The secondary storage 1116 may include various types of computer-readable media accessible by the computing nodes 1102 via the network 1118. A computer-readable medium may include storage media or memory media such as semiconductor storage, magnetic or optical media, e.g., disk or CD/DVD-ROM, or other storage technologies. Program instructions and data stored on the secondary storage 1116 may be transmitted to a computing node 1102 for execution by a processor 1104 by transmission media or signals via the network 1118, which may be a wired or wireless network or a combination thereof.

The network interface 1112 may be configured to allow data to be exchanged between computing nodes 1102 and/or other devices coupled to the network 1118 (such as other computer systems, communication devices, input/output devices, or external storage devices). The network interface 1112 may support communication via wired or wireless data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1114 may include one or more display terminals, keyboards, keypads, touchpads, scanning devices, voice or optical recognition devices, or any other devices suitable for entering or retrieving data by one or more computing nodes 1102. Multiple input/output devices 1114 may be present in a computing node 1102 or may be distributed on various computing nodes 1102 of the system 1100. In some embodiments, similar input/output devices may be separate from computing node 1102 and may interact with one or more computing nodes 1102 of the system 102 through a wired or wireless connection, such as over network interface 1112.

Those skilled in the art will appreciate that computing system 1100 is merely illustrative and is not intended to limit the scope of embodiments. In particular, the computing system 1100 may include any combination of hardware or software that can perform the functions disclosed herein, including computers, network devices, internet appliances, PDAs, wireless phones, pagers, etc. Computing node 1102 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of computing devices configurable to implement a plurality of resource instances of a provider network; and
one or more computing devices configured to implement a resource manager configured to:
responsive to a request from a client for allocation of a number of resource instances, assign the number of resource instances for use by the client;
responsive to selection by the client of a first allocation strategy provided by the resource manager for assigning the number of resource instances:
divide the number of resource instances into a plurality of sub-portions;
identify a first plurality of pools in which resource instances are available for allocation at a spot price that does not exceed a bid price specified by the client; and
assign each of the sub-portions from a different one of the first plurality of pools to reduce risk of deallocation of all resource instances assigned for use by the client due to rise in the spot of the resource instances above the bid price specified by the client; and responsive to selection by the client of a second allocation strategy provided by the resource manager for assigning the number of resource instances:
identify a second plurality of pools in which resource instances are available for allocation at a spot price that does not exceed a bid price specified by the client;
determine for each pool of the second plurality of pools of resource instances, an estimate of time that a unit cost of each of the number of resource instances will be less than the bid price specified by the client; and
assign the number of resource instances for use by the client from a pool of the second plurality of pools determined to have a longest estimate of time.

2. The system of claim 1, wherein the resource manager is configured to, responsive to selection by the client of a third allocation strategy provided by the resource manager for assigning the number of resource instances:
identify which of the plurality of resource instances is available at lowest cost; and
assign the number of resource instances for use by the client from the resource instances available at lowest cost.

3. A system, comprising:
a plurality of computing devices configurable to implement a plurality of resource instances of a provider network; and
one or more computing devices configured to implement a resource manager configured to:
provide a plurality of allocation strategies for determining which of the plurality of resource instances to assign to a client;
assign, for use by the client, a number of the resource instances requested by the client;
as part of a first of the plurality of allocation strategies:
determine for each of a plurality of pools of resource instances, an estimate of time that a unit cost of each of the number of resource instances will be less than a maximum unit cost specified by the client; and
assign the number of resource instances for use by the client from a one of the plurality of pools determined to have a longest estimate of time; and
as part of a second of the plurality of allocation strategies:
divide the number of resource instances into a plurality of sub-portions; and
assign each of the sub-portions, for use by the client, from a different pool of resource instances to reduce risk of deallocation of all resource instances assigned for use by the client due to rise in the unit cost of the resource instances above the amount specified by the client.

4. The system of claim 3, wherein the resource manager is configured to select the number of sub-portions based on a number of pools, specified by the client, across which the number of resource instances is to be diversified.

5. The system of claim 3, wherein the resource manager is configured to, as part of a third of the plurality of allocation strategies:
identify which of the plurality of resource instances is available at lowest cost; and
assign the number of resource instances for use by the client from the resource instances available at lowest cost.

6. The system of claim 3, wherein the resource manager is configured to analyze records indicating historical unit cost of resource instances in each of the plurality of pools to determine which of the pools provides the longest estimate of time that the unit cost of each of the number of resource instances in the pool will be no more than the maximum unit cost specified by the client.

7. The system of claim 1, wherein the resource manager is configured to simulate longevity of the number of resource instances in each of the plurality of pools over a predetermined historical time interval to determine the time estimate for each of the plurality pools.

8. The system of claim 3, wherein the resource manager is configured to change which of the plurality of allocation strategies is applied, based on a request by the client, after the number of resource instance has been has been assigned based on one of the allocation strategies previously specified by the client.

9. The system of claim 3, wherein the resource manager is configured to repetitively apply one of the allocation strategies to select the number of resource instances assigned to the client after an initial assignment of the number of resource instances based on the one of the allocation strategies.

10. The system of claim 9, wherein the resource manager is configured to assign resource instances identified by a latest application of the one of the allocation strategies prior to deallocation of resource instances assigned responsive to a previous application of the one of the allocation strategies.

11. The system of claim 9, wherein the resource manager is configured to reapply the given one of the allocation strategies to select the number of resource instances assigned to the client based on a determination that different resource instances will provide one of a cost, availability, or diversity advantage over the resource instances currently assigned to the client.

12. A method, comprising:
responsive to a request from a client for allocation of a number of resource instances at no more than a specified unit cost:
applying one of a plurality of allocation strategies, specified by the request, to select the number of resource instances, wherein the plurality of allocation strategies comprises:
a first allocation strategy that includes:
dividing the number of resource instances into a plurality of sub-portions, the number of sub-portions corresponding to a number pools of resource instances specified by the client; and
assigning each of the sub-portions from a different pool of resource instances to reduce risk of deallocation of all of the number resource instances assigned for use by the client due to rise in the unit cost of the resource instances above the specified unit cost; and
a second allocation strategy that includes:
determining for each of a plurality of pools of resource instances, an estimate of time that the unit cost of each of the number of resource instances will be less than the specified unit cost; and
assigning the number of resource instances for use by the client from a one of the plurality of pools determined to have a longest estimate of time.

13. The method of claim 12, wherein the second allocation strategy includes:
- determining which one of the plurality of pools of resource instances provides a highest likelihood that the number of resource instances will be available for use by the client until completion of a task to be executed by the number of resource instances; and
- assigning the number of resource instances for use by the client from the one of the plurality of pools to increase the likelihood that all of the number of resources are available until completion of the task.

14. The method of claim 13,
wherein higher likelihood corresponds to longer estimated time.

15. The method of claim 13, further comprising analyzing records indicating historical unit cost of resource instances in each of the plurality of pools to determine which of the pools provides the highest likelihood that the number of resource instances will be available for use by the client until completion of a task.

16. The method of claim 13, further comprising simulating longevity of the number of resource instances in the plurality of pools over a predetermined historical time interval to identify which of the pools provides the highest likelihood that the number of resource instances will be available for use by the client until completion of the task.

17. The method of claim 12, further comprising applying, responsive to a request from the client, a selected one of the allocation strategies to select the number of resource instances after the number of resource instances has been assigned to the client using a different one of the allocation strategies.

18. The method of claim 12, further comprising:
- repetitively applying a specified one of the allocation strategies to select the number of resource instances assigned to the client after an initial assignment of the number of resource instances based on the specified one of the allocation strategies; and
- assigning resource instances identified by a latest application of the specified one of the allocation strategies prior to deallocation of resource instances assigned responsive to a previous application of the specified one of the available allocation strategies.

19. The method of claim 12, wherein
a third allocation strategy includes:
- identifying which of the plurality of resource instances is available at lowest cost; and
- assigning the number of resource instances for use by the client from the resource instances available at lowest cost.

20. The method of claim 19, further comprising reapplying the third allocation strategy to select the number of resource instances assigned to the client based on a determination that reapplication of the third allocation strategy will reduce cost of the number of resource instances by at least an amount specified by the client.

* * * * *

UNITED STATES PATENT AND TRADEMARK OFFICE
CERTIFICATE OF CORRECTION

PATENT NO. : 10,230,664 B1
APPLICATION NO. : 14/860615
DATED : March 12, 2019
INVENTOR(S) : Dmitry Pushkarev et al.

Page 1 of 1

It is certified that error appears in the above-identified patent and that said Letters Patent is hereby corrected as shown below:

In the Claims

Claim 7 at Column 24, Line 11, should read -- The system of claim 6, wherein the resource manager --

Signed and Sealed this
Thirtieth Day of April, 2019

Andrei Iancu
*Director of the United States Patent and Trademark Office*